(12) United States Patent
Kim et al.

(10) Patent No.: US 12,728,851 B2
(45) Date of Patent: Sep. 8, 2026

(54) ADAPTIVE ECO CRUISE STRATEGY FOR IMPROVED ELECTRIC VEHICLE EFFICIENCY AND RANGE

(71) Applicant: Karma Automotive LLC, Irvine, CA (US)

(72) Inventors: Hyungjun Kim, Irvine, CA (US); Mehrdad Mirzaei, Irvine, CA (US); Sina Hamzehlouia, Irvine, CA (US)

(73) Assignee: Karma Automotive, Inc., Irvine, CA (US)

( * ) Notice: Subject to any disclaimer, the term of this patent is extended or adjusted under 35 U.S.C. 154(b) by 113 days.

(21) Appl. No.: 18/750,448

(22) Filed: Jun. 21, 2024

(65) Prior Publication Data

US 2025/0010856 A1 Jan. 9, 2025

Related U.S. Application Data

(60) Provisional application No. 63/512,035, filed on Jul. 5, 2023.

(51) Int. Cl.
*B60W 30/14* (2006.01)
*B60L 15/20* (2006.01)

(52) U.S. Cl.
CPC ........ *B60W 30/143* (2013.01); *B60L 15/2045* (2013.01); *B60L 2240/12* (2013.01);
(Continued)

(58) Field of Classification Search
CPC ......... B60W 30/143; B60W 2510/083; B60W 2510/18; B60W 2520/10; B60W 2530/10;
(Continued)

(56) References Cited

U.S. PATENT DOCUMENTS

2002/0173881 A1* 11/2002 Lash ......................... G01P 3/50 701/1
2007/0265759 A1* 11/2007 Salinas ..................... B60T 7/22 701/123

(Continued)

FOREIGN PATENT DOCUMENTS

DE 102020103644 B4 1/2023

OTHER PUBLICATIONS

Guo et al. (CN110843778.translate), Constant-speed cruise control method, device and equipment and storagemedium. (Year: 2020).*

(Continued)

*Primary Examiner* — B M M Hannan
(74) *Attorney, Agent, or Firm* — Honigman LLP; Thomas J. Appledorn; Grant Griffith

(57) ABSTRACT

A method includes receiving an eco-cruise control request that includes a requested cruise control velocity and a velocity tolerance. The eco-cruise control request instructs an drive unit to operate a vehicle at a velocity within the velocity tolerance of the requested cruise control velocity. The method also includes determining a range of candidate cruise control velocities that satisfy the velocity tolerance of the requested cruise control velocity. The method also includes determining an eco-cruise control velocity that maximizes a drive unit efficiency of the drive unit. Here, the eco-cruise control velocity includes one of the candidate cruise control velocities from the range of candidate cruise control velocities.

22 Claims, 6 Drawing Sheets

(52) U.S. Cl.
CPC ... *B60W 2510/083* (2013.01); *B60W 2510/18* (2013.01); *B60W 2520/10* (2013.01); *B60W 2530/10* (2013.01); *B60W 2530/16* (2013.01); *B60W 2540/215* (2020.02); *B60W 2552/15* (2020.02); *B60W 2720/10* (2013.01)

(58) Field of Classification Search
CPC ....... B60W 2530/16; B60W 2540/215; B60W 2552/15; B60W 2720/10; B60W 30/00; B60W 50/0097; B60L 15/2045; B60L 2240/12
USPC ............................................................ 701/93
See application file for complete search history.

(56) References Cited

U.S. PATENT DOCUMENTS

| | | | | |
|---|---|---|---|---|
| 2008/0306668 | A1* | 12/2008 | Wang | B60K 31/00 701/93 |
| 2015/0066327 | A1 | 3/2015 | Syed et al. | |
| 2016/0159352 | A1* | 6/2016 | Kim | B60W 30/143 701/93 |
| 2016/0221576 | A1* | 8/2016 | Wang | B60W 10/06 |
| 2017/0291605 | A1 | 10/2017 | Grewal et al. | |
| 2019/0283601 | A1 | 9/2019 | Koebler et al. | |
| 2019/0308640 | A1* | 10/2019 | Miller | B60W 30/182 |
| 2020/0017078 | A1 | 1/2020 | Perlick et al. | |
| 2020/0164745 | A1* | 5/2020 | Mohan | F02D 29/02 |
| 2021/0300364 | A1* | 9/2021 | Sadamura | B60W 30/146 |
| 2022/0219691 | A1* | 7/2022 | Maleki | G06F 11/0754 |
| 2022/0250620 | A1* | 8/2022 | Hu | B60W 10/06 |
| 2022/0410888 | A1* | 12/2022 | Nelson | G06N 20/00 |
| 2023/0150502 | A1* | 5/2023 | Dickson | B60W 50/14 701/95 |
| 2023/0160707 | A1* | 5/2023 | Kibalama | B60L 50/61 701/22 |
| 2023/0182735 | A1* | 6/2023 | Andermård | G01S 17/86 701/96 |
| 2024/0199012 | A1* | 6/2024 | Diamond | B60W 30/143 |
| 2024/0253628 | A1* | 8/2024 | Gudapati | B60W 30/16 |
| 2024/0351584 | A1* | 10/2024 | Zebiak | B60W 30/143 |

OTHER PUBLICATIONS

Hu et al. (CN114643987.translate), Vehicle cruise control method and device, electronic equipment and vehicle. (Year: 2022).*
Lee Jeong Hee (KR20220106488.translate), System and Method for Cruise Control of Vehicle. (Year: 2022).*
Schwickart et al. "A novel model-predictive cruise controller for electric vehicles and energy-efficient driving" 2014 IEEE/ASME International Conference on Advanced Intelligent Mechatronics. DOI: 10.1109/AIM.2014.6878222. Jul. 8, 2014.
Zhang et al. "An Eco-Cruise Control for Electric Vehicles Moving on Slope Road with Constant Speed" Journal of Advanced Transportation, 2021. DOI: https://doi.org/10.1155/2021/9562560. Dated Oct. 18, 2021.
Schwickart et al. "An efficient nonlinear model-predictive eco-cruise control for electric vehicles". IEEE International Conference on Industrial Informatics (INDIN), 311-316. DOI: 10.1109/INDIN.2013.6622901. dated Jul. 29, 2013.
Schwickart et al. "Design and simulation of a real-time implementable energy-efficient model-predictive cruise controller for electric vehicles". Journal of the Franklin institute, 352(2), 603-625. https://doi.org/10.1016/j.jfranklin.2014.07.001. Dated Feb. 2015.
Alrifaee et al. "ECO-cruise control using economic model predictive control". 2015 IEEE Conference on Control Applications (CCA). DOI: 10.1109/CCA.2015.7320892. DAted: Sep. 21, 2015.
Chen et al. "Design and Experimental Evaluations on Energy Efficient Control Allocation Methods for Overactuated Electric Vehicles: Longitudinal Motion Case". IEEE/ASME Transactions on Mechatronics ( vol. 19, Issue: 2, Apr. 2014). DOI: 10.1109/TMECH.2013.2249591. Mar. 15, 2013.
International Search Report and Written Opinion (EPO) for Application No. PCT/US2024/033719 Dated Oct. 11, 2024.

* cited by examiner

ADAPTIVE ECO CRUISE STRATEGY FOR IMPROVED ELECTRIC VEHICLE EFFICIENCY AND RANGE

CROSS-REFERENCE TO RELATED APPLICATIONS

This U.S. patent application claims priority under 35 U.S.C. § 119 (e) to U.S. Provisional Application 63/512,035, filed on Jul. 5, 2023. The disclosure of this prior application is considered part of the disclosure of this application and is hereby incorporated by reference in its entirety.

TECHNICAL FIELD

This disclosure relates to an adaptive eco cruise strategy for improved electric vehicle efficiency and range.

BACKGROUND

Optimizing vehicle efficiency and maximizing an operable range is one of the most significant challenges in developing battery electric vehicles and hybrid electric vehicles. Various energy saving technologies have been developed for these vehicles including regenerative braking, energy efficient tires, and improved aerodynamics. Cruise control is one of the most used driver-assistance features in modern vehicles. Yet, cruise control systems simply enable a driver of the vehicle to select a velocity set point and operate the vehicle at the velocity set point without any regards to optimizing efficiency of the vehicle operating at a cruise control velocity. Thus, optimizing efficiencies of vehicles using the cruise control driver-assistance feature would greatly improve the overall vehicle efficiency and operable range of vehicles.

SUMMARY

One aspect of the disclosure provides a computer-implemented method that when executed on data processing hardware causes the data processing hardware to perform operations for performing an adaptive eco cruise strategy for improved electric vehicle efficiency and range. The operations include receiving an eco-cruise control request that includes a requested cruise control velocity and a velocity tolerance. The eco-cruise control request instructs a drive unit to operate a vehicle at a velocity within the velocity tolerance of the requested cruise control velocity. The operations also include determining a range of candidate cruise control velocities that satisfy the velocity tolerance of the requested cruise control velocity and receiving vehicle dynamic information of the vehicle from one or more sensors implemented on the vehicle. The operations also include determining an eco-cruise control velocity based on the vehicle dynamic information that maximizes a drive unit of the drive unit. The eco-cruise control velocity includes one of the candidate cruise control velocities from the range of candidate cruise control velocities.

Implementations of the disclosure may include one or more of the following optional features. In some implementations, determining the range of candidate cruise control velocities includes setting a median candidate cruise control velocity from the range of candidate cruise control velocities equal to a value of the requested cruise control velocity. In other implementations, determining the range of candidate cruise control velocities includes setting a minimum candidate cruise control velocity from the range of candidate cruise control velocities equal to a value of the requested cruise control velocity. In yet other implementations, determining the range of candidate cruise control velocities includes setting a maximum candidate cruise control velocity from the range of candidate cruise control velocities equal to a value of the requested cruise control value.

In some examples, the operations further include, for each respective candidate cruise control velocity from the range of candidate cruise control velocities, determining a required traction force for the respective candidate cruise control velocity based on a road grade value and a vehicle mass value of the vehicle, determining a traction torque for a corresponding required traction force based on a final gear ratio of the drive unit implemented on the vehicle and a dynamic radius of tires implemented on the vehicle, and determining a drive unit efficiency for the respective candidate cruise control value based on a corresponding traction torque and an inverter direct current bus voltage. In these examples, determining the eco-cruise control velocity includes selecting the one of the candidate cruise control velocities from the range of candidate cruise control velocities having the greatest drive unit efficiency as the eco-cruise control velocity.

In some implementations, while the vehicle operates at the eco-cruise control velocity, the operations further include: obtaining a current velocity of the vehicle, a motor feedback torque of the drive unit, and a corresponding traction torque for the eco-cruise control velocity; determining that the vehicle operating at the eco-cruise control velocity satisfies a threshold based on the current velocity of the vehicle, the motor feedback torque obtained from the drive unit, and the corresponding traction torque for the eco-cruise control velocity; and generating a velocity correction trigger based on determining that the vehicle operating at the eco-cruise control velocity satisfies the threshold. In these implementations, the operations further include, in response to generating the velocity correction trigger: determining a road disturbance value based on a road grade value, a vehicle mass value, the corresponding traction torque for the eco-cruise control velocity, and the motor feedback torque; and adjusting the eco-cruise control velocity based on the vehicle dynamic information and the road disturbance value.

The vehicle dynamic information may include at least one of a road grade value of the road the vehicle is traveling upon, a vehicle mass of the vehicle, brake drag forces of the vehicle, wheel bearing drag forces of the vehicle, or an inverter direct current bus voltage of the vehicle. In some examples, the eco-cruise control request is received in response to a user input indication indicating selection of a button disposed on a steering wheel of the vehicle or an instrument panel of the vehicle. The operations may further include obtaining a speed limit for a road the vehicle is currently traveling upon where determining the range of candidate cruise control velocities that satisfy the velocity tolerance of the requested cruise control velocity includes determining the range of candidate cruise control velocities based on the speed limit for the road the vehicle is currently traveling upon.

Another aspect of the disclosure provides a vehicle that includes a drive unit, data processing hardware, and memory hardware storing instructions that when executed on the data processing hardware causes the data processing hardware to perform operations. The operations include receiving an eco-cruise control request that includes a requested cruise control velocity and a velocity tolerance. The eco-cruise control request instructs the drive unit to operate a vehicle at a velocity within the velocity tolerance of the requested cruise control velocity. The operations also include determining a range of candidate cruise control velocities that satisfy the velocity tolerance of the requested cruise control velocity and receiving vehicle dynamic information of the vehicle from one or more sensors implemented on the vehicle. The operations also include determining an eco-cruise control velocity based on the vehicle dynamic information that maximizes a drive unit efficiency of the drive unit. The eco-cruise control velocity includes one of the candidate cruise control velocities from the range of candidate cruise control velocities.

Implementations of the disclosure may include one or more of the following optional features. In some implementations, determining the range of candidate cruise control velocities includes setting a median candidate cruise control velocity from the range of candidate cruise control velocities equal to a value of the requested cruise control velocity. In other implementations, determining the range of candidate cruise control velocities includes setting a minimum candidate cruise control velocity from the range of candidate cruise control velocities equal to a value of the requested cruise control velocity. In yet other implementations, determining the range of candidate cruise control velocities includes setting a maximum candidate cruise control velocity from the range of candidate cruise control velocities equal to a value of the requested cruise control value.

In some examples, the operations further include, for each respective candidate cruise control velocity from the range of candidate cruise control velocities, determining a required traction force for the respective candidate cruise control velocity based on a road grade value and a vehicle mass value of the vehicle, determining a traction torque for a corresponding required traction force based on a final gear ratio of the drive unit implemented on the vehicle and a dynamic radius of tires implemented on the vehicle, and determining a drive unit efficiency for the respective candidate cruise control value based on a corresponding traction torque and an inverter direct current bus voltage. In these examples, determining the eco-cruise control velocity includes selecting the one of the candidate cruise control velocities from the range of candidate cruise control velocities having the greatest drive unit efficiency as the eco-cruise control velocity.

In some implementations, while the vehicle operates at the eco-cruise control velocity, the operations further include: obtaining a current velocity of the vehicle, a motor feedback torque of the drive unit, and a corresponding traction torque for the eco-cruise control velocity; determining that the vehicle operating at the eco-cruise control velocity satisfies a threshold based on the current velocity of the vehicle, the motor feedback torque obtained from the drive unit, and the corresponding traction torque for the eco-cruise control velocity; and generating a velocity correction trigger based on determining that the vehicle operating at the eco-cruise control velocity satisfies the threshold. In these implementations, the operations further include, in response to generating the velocity correction trigger: determining a road disturbance value based on a road grade value, a vehicle mass value, the corresponding traction torque for the eco-cruise control velocity, and the motor feedback torque; and adjusting the eco-cruise control velocity based on the vehicle dynamic information and the road disturbance value.

The vehicle dynamic information may include at least one of a road grade value of the road the vehicle is traveling upon, a vehicle mass of the vehicle, brake drag forces of the vehicle, wheel bearing drag forces of the vehicle, or an inverter direct current bus voltage of the vehicle. In some examples, the eco-cruise control request is received in response to a user input indication indicating selection of a button disposed on a steering wheel of the vehicle or an instrument panel of the vehicle. The operations may further include obtaining a speed limit for a road the vehicle is currently traveling upon where determining the range of candidate cruise control velocities that satisfy the velocity tolerance of the requested cruise control velocity includes determining the range of candidate cruise control velocities based on the speed limit for the road the vehicle is currently traveling upon.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
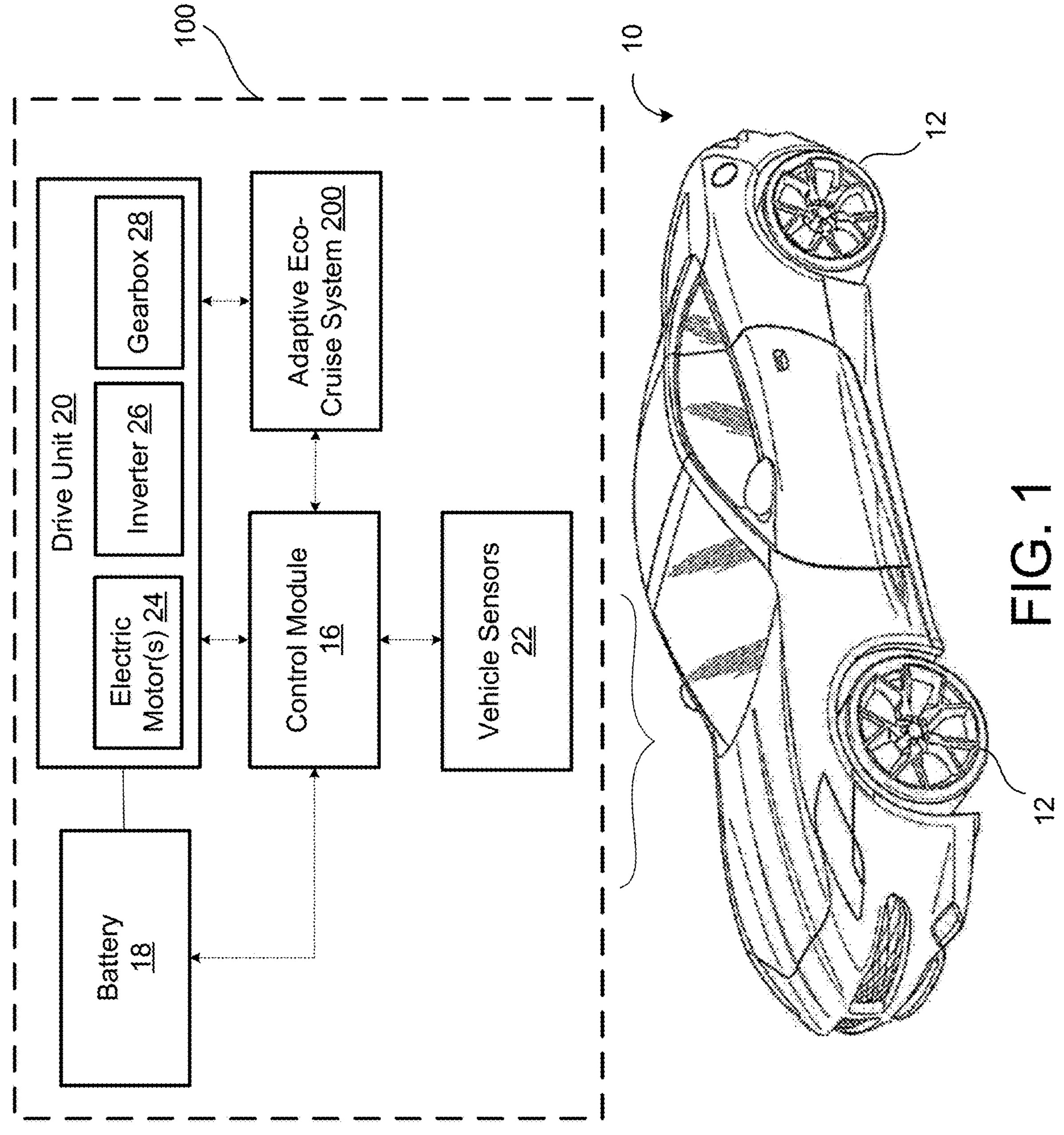
FIG. 1 is a schematic view of an example vehicle including an example adaptive eco cruise system.

Referring to FIG. 1, a vehicle 10, such as a battery-powered electric vehicle, a plug-in hybrid electric vehicle, and/or an internal combustion engine vehicle includes a vehicle controller 100. In some implementations, the vehicle controller 100 includes a control module 16, a drive unit 20, one or more vehicle sensors (e.g., sensors) 22 implemented on the vehicle 10, and an adaptive eco-cruise system 200. In some configurations, the vehicle 10 is a battery-powered electric vehicle or a plug-in hybrid electric vehicle such that the drive unit 20 includes one or more electric motors 24, an inverter 26, and a gearbox 28. In other configurations, the vehicle 10 is an internal combustion engine vehicle such that the drive unit 20 includes the gearbox 28 and an engine (not shown). The vehicle 10 may also include one or more wheels 12 implemented on the vehicle 10.

The control module 16 is configured to control operation of the vehicle 10 and may include data processing hardware 610 (FIG. 6) and memory hardware 620 (FIG. 6) in communication with the data processing hardware and storing instructions that when executed on the data processing hardware cause the data processing hardware to perform operations. In particular, the control module 16 may send control signals to the inverter 20 to control operation of one or more electric motors 24 implemented on the vehicle 10 based on sensor data received from the one or more vehicle sensors 22. In some examples, the control module 16 controls operation of the one or more electric motors 24 based on requested cruise control velocities received from the adaptive eco-cruise system 200. A battery or energy storage device (ESD) 18 of the vehicle 10 supplies the electric power for operating the adaptive eco-cruise system 200 and the inverter 20 which is electrically coupled between the ESD 18 and electric motor 24.

Figure 2:
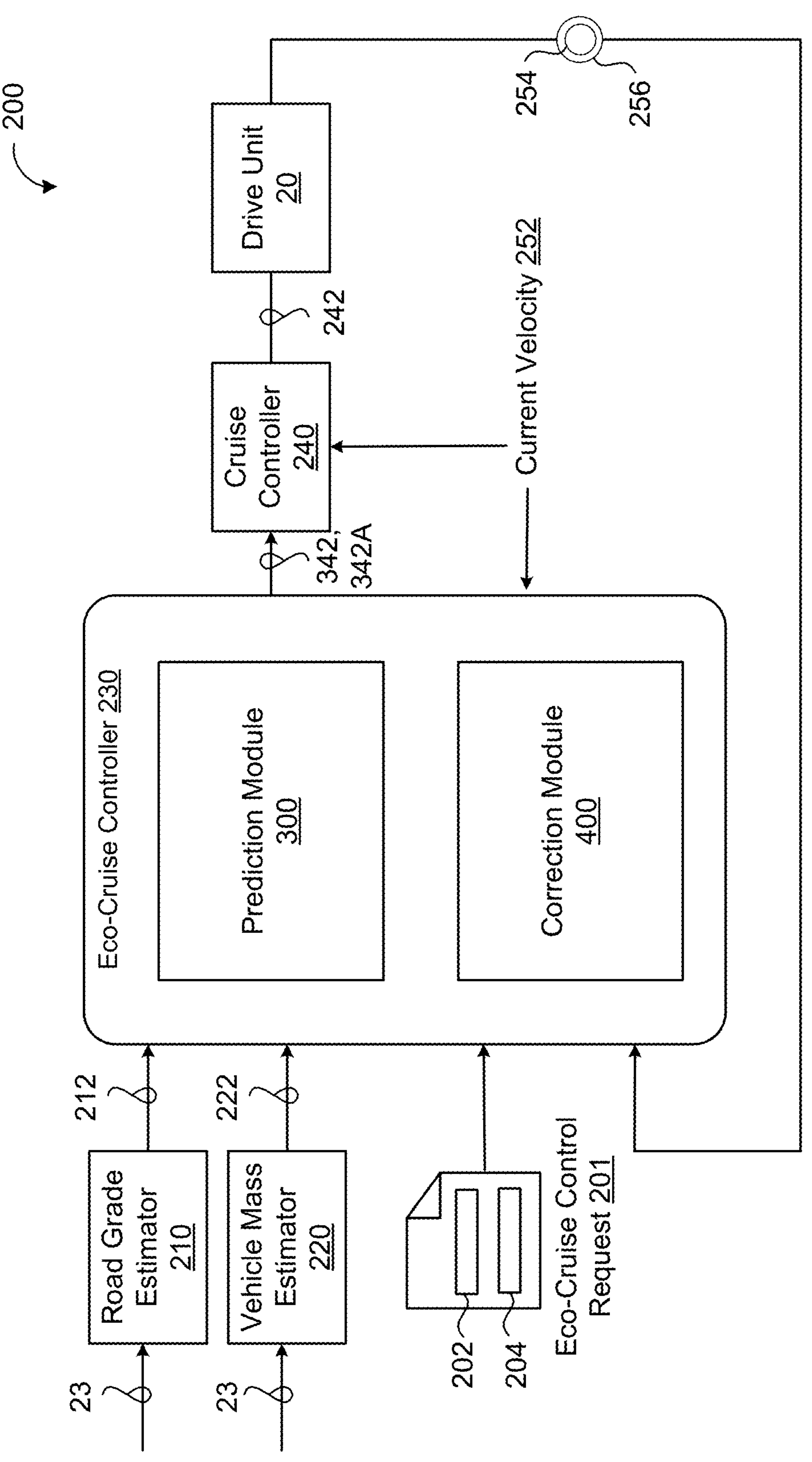
FIG. 2 is a schematic view of the example adaptive eco cruise system of FIG. 1.

Referring now to FIG. 2, in some implementations, the adaptive eco-cruise system 200 includes a road grade estimator 210, a vehicle mass estimator 220, an eco-cruise controller 230, a cruise controller 240, and the drive unit 20. The drive unit 20 may correspond to a drive unit for an electric vehicle (e.g., electric motor 24, inverter 26, and/or gearbox 28 (FIG. 1)) or a drive unit for an internal combustion engine vehicle (e.g., engine and/or gearbox 28 (FIG. 1)). A driver of the vehicle 10 may enable/disable the eco-cruise controller 230 by in response to a user/driver input indication indicating selection of a button (e.g., eco-cruise mode button) disposed on a steering wheel of the vehicle 10, an instrument panel, and/or heads-up display of the vehicle. The driver of the vehicle 10 may also enable/disable the eco-cruise controller 230 by generating an eco-cruise control request 201. In some examples, the eco-cruise controller 230 is enabled responsive to the driver selecting certain drive modes of the vehicle 10. For instance, entering an eco-drive mode may automatically cause the eco-cruise controller 230 to enable, while entering a sport drive mode automatically causes the eco-cruise controller 230 to disable. As will become apparent, when the eco-cruise controller 230 is enabled, the eco-cruise controller 230 generates an eco-cruise control velocity 342 that maximizes an operating efficiency of the vehicle. Here, the eco-cruise control velocity 342 may correspond to any velocity within a velocity tolerance 204 of a requested cruise control velocity 202. On the other hand, when the eco-cruise controller 230 is disabled, the cruise controller 240 controls the cruise control velocity of the vehicle 10 in conventional fashion by operating the vehicle 10 at a target velocity set equal to a value of the requested cruise control velocity 202. That is, when the eco-cruise controller 230 is disabled, the cruise controller 240 operates the vehicle at the requested cruise control velocity 202 regardless of whether there is a more efficient velocity to operate the vehicle 10 that is proximate to the requested cruise control velocity.

Thus, when the eco-cruise controller 230 is enabled, the driver of the vehicle 10 may generate an eco-cruise control request 201 that includes the requested cruise control velocity 202 and the velocity tolerance 204. The eco-cruise control request 201 is configured to instruct the drive unit 20 to operate the vehicle at a velocity within the velocity tolerance 204 of the requested cruise control velocity 202. For instance, the eco-cruise control request 201 may instruct the electric motor 24 (FIG. 1) of the drive unit 20 to operate at the velocity within the velocity tolerance 204 of the requested cruise control velocity 202. In particular, the eco-cruise control request 201 indicates to the eco-cruise controller 230 that any velocity within the velocity tolerance 204 of the requested cruise control velocity 202 is suitable to the driver of the vehicle 10. Thus, the eco-cruise controller 230 selects one of the suitable velocities that maximizes an operating efficiency of the vehicle 10 during operation in the eco-cruise control mode.

The driver of the vehicle 10 may generate the requested cruise control velocity 202 of the eco-cruise control request 201 via a torque request, i.e., by actuating a throttle position (e.g., accelerator pedal) of the vehicle 10, and simultaneously pressing an eco-cruise mode on the steering wheel and/or instrument panel of the vehicle 10. Additionally or alternatively, the driver may directly select the requested cruise control velocity 202 by pressing a button on the steering wheel or the instrument panel without actuating the throttle position.

In some examples, the velocity tolerance 204 includes a predetermined value selected by the driver for all requested cruise control velocities 202 and is stored at the eco-cruise controller 230. For instance, the driver may select (e.g., via the steering wheel or the instrument panel of the vehicle 10) the predetermined value for the velocity tolerance 204 as a percentage of the requested cruise control velocity 202 (e.g., 10 percent of the requested cruise control velocity 202) or as a predetermined range of velocities including the requested cruise control velocity 202 (e.g., a 15 miles per hour (MPH) range of velocities that includes the requested cruise control velocity 202). In these instances, the eco-cruise controller 230 uses the predetermined value of the velocity tolerance 204 for every eco-cruise control request 201. In other examples, the driver generates the velocity tolerance 204 in connection with requested cruise control velocity 202. For example, the driver may generate an eco-cruise control request 201 that includes a 70 MPH requested cruise control velocity 202 and a 7 percent velocity tolerance 204 in connection with the requested cruise control velocity 202 via button selections on the steering wheel or selections on the instrument panel of the vehicle 10. In yet other examples, the driver generates a requested cruise control velocity 202 and, in response to determining that the eco-cruise controller 230 is enabled when the requested cruise control velocity 202 is received, the adaptive eco-cruise system 200 prompts the driver to generate a corresponding velocity tolerance 204 via the steering wheel or the instrument panel of the vehicle 10.

In some implementations, each respective drive mode of a plurality of drive modes for the vehicle 10 includes a corresponding predetermined velocity tolerance 204. For instance, in an eco-drive mode, the vehicle 10 may aim to maximize efficiency of the vehicle 10 over performance of the vehicle 10 in contrast to a sport drive mode of the vehicle that aims to maximize performance of the vehicle 10 over efficiency of the vehicle 10. As such, the predetermined velocity tolerance 204 associated with the eco-drive mode may be larger than the predetermined velocity tolerance 204 associated with the sport drive mode.

The road grade estimator 210 and the vehicle mass estimator 220 are each configured to generate corresponding vehicle dynamic information that the eco-cruise controller 230 uses to select the cruise control velocity within the velocity tolerance 204 of the requested cruise control velocity 202. Namely, the road grade estimator 210 is configured to determine a road grade value 212 of a road the vehicle 10 is currently traveling upon based on sensor data 23 received from the one or more sensors 22 implemented on the vehicle 10 (FIG. 1). More specifically, the sensor data 23 may include vehicle pitch, yaw, and/or roll data of the vehicle. Additionally or alternatively, the sensor data may include geographical coordinates of the vehicle to identify a segment of road the vehicle is traveling on, allowing the system 200 to ascertain the road grade value 212 of the identified segment (e.g., via a look-up table storing road grade values for segments of roadway). The road grade value 212 indicates a measure of incline (or decline) of the road over a given distance. For example, a 5% road grade value 212 may indicate the road the vehicle 10 is traveling upon inclines (or declines) 5 feet vertically over 100 horizontal feet of road. The vehicle mass estimator 220 is configured to determine a vehicle mass value 222 of the vehicle 10. In some examples, the vehicle mass value 222 is a predetermined mass set by a manufacturer of the vehicle 10. In other examples, the vehicle mass estimator 220 determines the vehicle mass value 222 based on a mass of the vehicle, a mass of passengers in the vehicle, and/or a mass of cargo in the vehicle determined by sensor data 23 from the one or more sensors 22 implemented on the vehicle 10. Notably, each of the road grade value 212 and the vehicle mass value 222 influence which velocity maximizes the efficiency for the vehicle 10 to operate at and may be collectively referred to as 'vehicle dynamic information' of the vehicle 10. For example, it may be more efficient for the vehicle 10 to operate at 40 MPH when traveling on a portion of a road with an inclined road grade and, on the other hand, it is more efficient to operate at 50 MPH when traveling on a portion of the road with a declined road grade.

Described in greater detail with reference to FIG. 3, the eco-cruise controller 230 includes a prediction module 300 configured to generate an eco-cruise control velocity 342 that optimizes a drive unit efficiency 344 (FIG. 3) of the drive unit 20 based on the requested cruise control velocity 202 and the velocity tolerance 204. Thus, the drive unit efficiency 344 may refer to any combination of an efficiency for the electric motor 24, an efficiency for inverter 26, and/or and efficiency for the gearbox 28 (FIG. 1). Moreover, the eco-cruise controller 230 includes a correction module 400 configured to generate a velocity correction trigger 412, thereby causing the prediction module 300 to adjust the eco-cruise control velocity 342, 342A, as described in greater detail with reference to FIG. 4. The eco-cruise controller 230 outputs the eco-cruise control velocity 342 or the adjusted eco-cruise control velocity 342A to the cruise controller 240. Based on the eco-cruise control velocity 342 or the adjusted eco-cruise control velocity 342A, the cruise controller 240 is configured to generate a motor torque command 242 that instructs the electric drive unit 20 to operate the vehicle 10 at the eco-cruise control velocity 342 or the adjusted eco-cruise control velocity 342A output by the eco-cruise controller 230.

The cruise controller 240 continuously receives a current velocity 252 of the vehicle as feedback and continuously update/adjust (e.g., increase/decrease/maintain) the motor torque command 242. The current velocity 252 may be measured by one or more of the vehicle sensors 22, such as an axle or wheel speed sensor. Optionally, the current velocity 252 may be calculated by the drive unit 20 based on a final gear ratio 334 (FIG. 3) of the gearbox 28 (FIG. 1) of the drive unit 20 and/or a dynamic radius 336 (FIG. 3) of tires of the vehicle 10. The drive unit 20 also provides, as feedback, a motor feedback torque 254 and an inverter direct current (DC) bus voltage 256 (e.g., received from the inverter 26 (FIG. 1)) to the eco-cruise controller 230. The eco-cruise controller 230 also receives the current velocity 252 of the vehicle 10. Thus, the eco-cruise controller 230 uses the motor feedback torque 254 and/or the inverter DC bus voltage 256 to generate the eco-cruise control velocity 342 or the adjusted eco-cruise control velocity 342A. In a hybrid or internal combustion engine-based vehicle, the drive unit may provide an engine speed and/or engine torque as feedback in addition to, or in lieu of, the motor feedback torque 254 and the inverter DC bus voltage 256.

Figure 3:
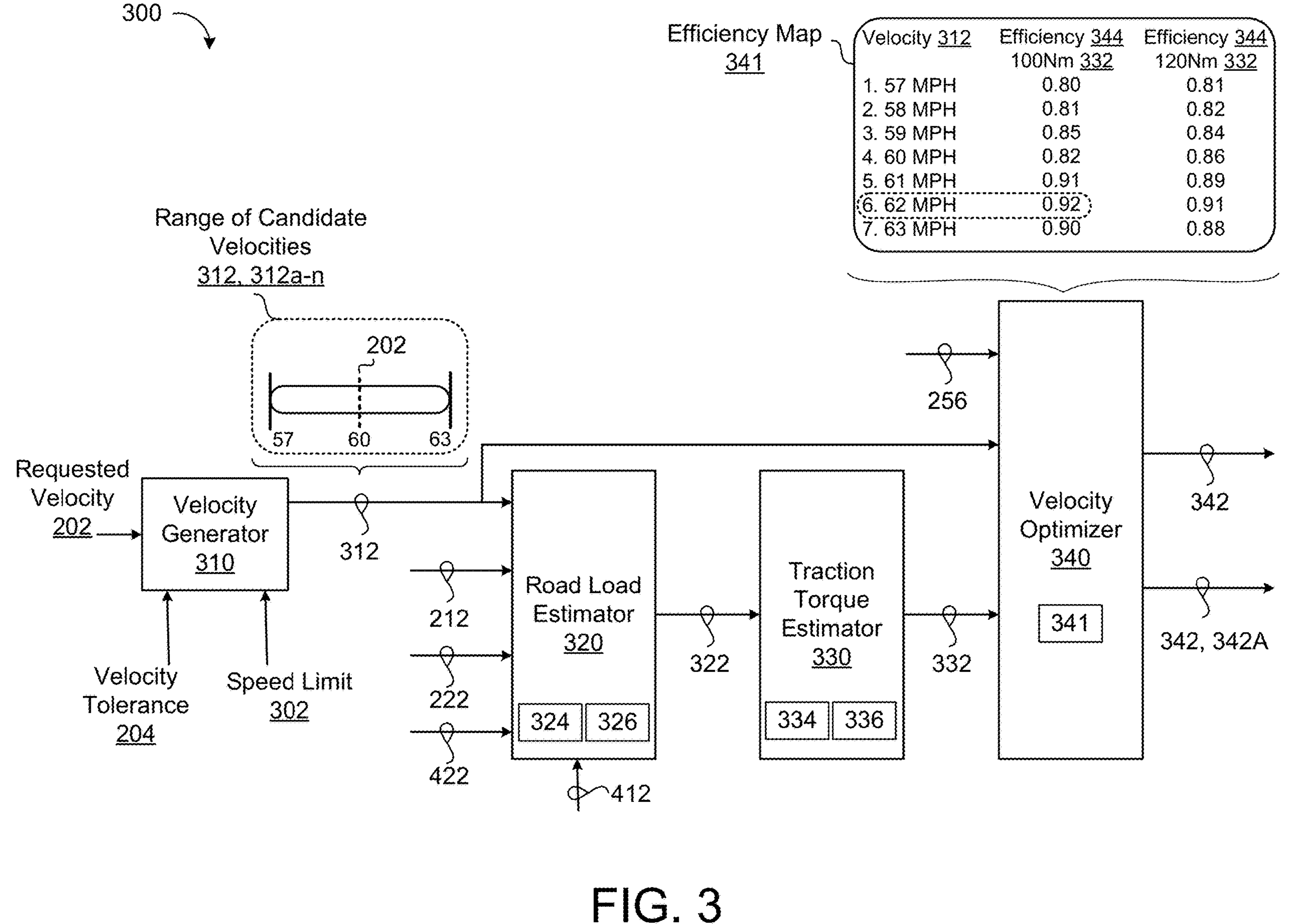
FIG. 3 is a schematic view of an example prediction module of an eco-cruise controller.

Referring now to FIG. 3, in some implementations the prediction module 300 includes a candidate velocity generator 310, a road load estimator 320, a traction torque estimator 330, and a velocity optimizer 340. The candidate velocity generator 310 is configured to receive, as input, the eco-cruise control request 201 including the requested cruise control velocity ($V_{req}$) 202 and the velocity tolerance ($V_{BW}$) 204 and determine a range of candidate cruise control velocities (V(i)) 312, 312*a-n* that satisfy the velocity tolerance 204 of the requested cruise control velocity 202. In particular, the candidate velocity generator 310 determines the range of candidate cruise control velocities 312 based on the requested cruise control velocity 202 and the velocity tolerance 204 where (i) represents each candidate cruise control velocity 312 in the range of candidate cruise control velocities 312. Here, each candidate cruise control velocity 312 in the range of candidate cruise control velocities 312 represents a corresponding velocity within the velocity tolerance 204 of the requested cruise control velocity 202. In other words, since the driver provided the velocity tolerance 204 as part of the eco-cruise control request 201, each candidate cruise control velocity 312 in the range of candidate cruise control velocities 312 represents a velocity to operate the vehicle 10 that is suitable to the driver of the vehicle 10.

In the example shown, the candidate velocity generator 310 receives the eco-cruise control request 201 that includes a requested cruise control velocity 202 of 60 MPH and a velocity tolerance 204 of 5-percent. Thus, in this example, any velocity within the 5-percent velocity tolerance 204 of the 60 MPH requested cruise control velocity 202 is a cruise control velocity that is suitable to the driver of the vehicle 10. Accordingly, the candidate velocity generator 310 determines the range of candidate cruise control velocities 312 including velocities from 57 MPH to 63 MPH. Alternatively, the velocity tolerance 204 may have included a 6 MPH velocity tolerance 204 such that the candidate velocity generator 310 determines the same range of candidate cruise control velocities 312 (e.g., 6 MPH range) including velocities from 57 MPH to 63 MPH.

In the example shown, the candidate velocity generator 310 determines the range of candidate cruise control velocities 312 by setting a median candidate cruise control velocity 312 from the range of candidate cruise control velocities 312 equal to a value of the requested cruise control velocity. In other examples (not shown), the candidate velocity generator 310 determines the range of candidate cruise control velocities 312 by setting a minimum or maximum candidate cruise control velocity 312 from the range of candidate cruise control velocities 312 equal to a value of the requested cruise control velocity 202. For instance, continuing with the example above, the candidate velocity generator 310 may determine the range of candidate cruise control velocities 312 including velocities from 60 MPH to 66 MPH (e.g., setting the minimum candidate cruise control velocity 312 equal to the value of the requested cruise control velocity 202) or including velocities from 54 MPH to 60 MPH (e.g., setting the maximum candidate cruise control velocity 312 equal to the value of the requested cruise control velocity 202). In yet other examples, the candidate velocity generator 310 determines the range of candidate cruise control velocities 312 by setting any candidate cruise control velocity 312 from the range of candidate cruise control velocities 312 equal to the value of the requested cruise control velocity 202. Notably, the candidate velocity generator 310 may obtain a current speed limit 302 (e.g., maximum or minimum speed limit) of the road the vehicle is currently traveling upon. For instance, the vehicle 10 may ascertain the current speed limit 302 based on a geographical location of vehicle derived from a GPS signal and/or image recognition of a posted speed limit sign captured by a camera of the vehicle. Thus, the candidate velocity generator 310 may generate the range of candidate cruise control velocities 312 based on the current speed limit 302 such that the requested cruise control velocity 202 input by the driver is a request to operate at a velocity equal to the current speed limit 302, or a velocity equal to a value greater than or less than the current speed limit 302. Here, the current speed limit 302 may cause the candidate velocity generator 310 to restrict the range of candidate cruise control velocities 312 for candidate cruise control velocities 312 that do not adhere to the current speed limit 302 but would otherwise satisfy the velocity tolerance 204 for the requested cruise control velocity 202.

Since each candidate cruise control velocity 312 in the range of candidate cruise control velocities 312 is a suitable cruise control velocity for the vehicle 10 to operate at, the prediction module 300 is configured to select a respective one of the candidate cruise control velocities 312 that maximizes a drive unit efficiency 344 of the drive unit 20 (FIG. 2) implemented on the vehicle 10 based on various vehicle dynamic information of the vehicle 10. As such, maximizing the drive unit efficiency 344 of the vehicle 10 increases an overall efficiency of the vehicle 10 and extends the operating range of the battery 18 (FIG. 1) implemented on the vehicle 10. Notably, the present disclosure is not limited to maximizing drive unit efficiency 344, and may additionally or alternatively include selecting candidate cruise control velocities 312 that maximize engine efficiency for vehicles equipped with engines.

To that end, the road load estimator 320 is configured to receive, as input, the range of candidate cruise control velocities 312, the road grade value (θ) 212, and the vehicle mass value (m) 222. Optionally, the road load estimator 320 may also receive predetermined vehicle parameters including brake drag forces 324 and/or wheel bearing drag forces 326 that are stored at the road load estimator 320. The road load estimator 320 determines a required traction force vector (F*(i)) 322 for the range of candidate cruise control velocities 312. That is, for each respective candidate cruise control velocity (i) 312 from the range of candidate cruise control velocities 312, the traction torque estimator 330 determines a corresponding required traction force 322 required for the vehicle 10 to maintain the respective candidate cruise control velocity (i) 312 based on some combination of the road grade value 212, the vehicle mass value 222, the brake drag forces 324, and/or the bearing drag forces 326 collectively referred to as 'vehicle dynamic information of the vehicle 10.'

Thereafter, the traction torque estimator 330 receives the required traction force vector 322 and determines a traction torque vector (T*(i)) 332 for each required traction force 322 in the required traction force vector 322. In particular, for each respective required traction force 322 from the required traction force vector 322, the traction torque estimator 330 determines a corresponding traction torque 332 based on a final gear ratio 334 of the electric drive unit 20 (FIG. 2) and/or a dynamic radius 336 of tires of the vehicle 10. The final gear ratio 334 and the dynamic radius 336 of the tires may be predetermined parameters stored at the traction torque estimator 330.

The velocity optimizer 340 is configured to receive, as input, the inverter DC bus voltage 256, the range of candidate cruise control velocities 312, and the traction torque vector 332 and generate/determine, at output, an eco-cruise control velocity ($V_{set}$*) 342 based on the traction torque vector 332 and the inverter DC bus voltage 256. Here, traction torque vector 332 and the inverter DC bus voltage 256 may also be included in, and be referred to as, 'vehicle dynamic information of the vehicle 10.' The eco-cruise control velocity 342 indicates cruise control velocity of the vehicle 10 that maximizes the drive unit efficiency 344 of the drive unit 20 (FIG. 2) implemented on the vehicle 10 from the range of candidate cruise control velocities 312. That is, the eco-cruise control velocity 342 is a respective one of the candidate cruise control velocities 312 from the range of candidate cruise control velocities 312 that has the greatest drive unit efficiency 344.

More specifically, the velocity optimizer 340 may generate the eco-cruise control velocity 342 based on the inverter DC bus voltage 256, the traction torque vector 332, and a drive unit efficiency map 341. The drive unit efficiency map 341 indicates a most efficient cruise control velocity to operate the vehicle 10 at for every possible combination the inverter DC bus voltage 256, the range of candidate cruise control velocities 312, and the traction torque vector 332. The prediction module 300 generates the drive unit efficiency map 341 during vehicle testing and/or dynamometer testing of the vehicle 10 at every possible combination of traction torque 332, vehicle velocity (e.g., candidate cruise control velocity 312), and inverter DC bus voltage 256 of the vehicle 10. Here, generating the drive unit efficiency map 341 includes determining a corresponding drive unit efficiency 344 for the drive unit 20 (FIG. 2) implemented on the vehicle 10 each respective combination of the traction torque 332, vehicle velocity (e.g., candidate cruise control velocity 312), and inverter DC bus voltage 256 of the vehicle 10.

Accordingly, during operation of the vehicle 10, the velocity optimizer 340 determines a corresponding drive unit efficiency 344 for each respective candidate cruise control velocity 312 from the range of candidate cruise control velocities 312 based on a corresponding traction torque 332 of the respective candidate cruise control velocity 312 and the inverter DC bus voltage 256. More specifically, the velocity optimizer 340 determines the corresponding drive unit efficiency 344 by obtaining the corresponding drive unit efficiency 344 from the drive unit efficiency map 341 using the inverter DC bus voltage 256 and the corresponding traction torque 332 of the respective candidate cruise control velocity 312. Thus, the velocity optimizer 340 generate the eco-cruise control velocity 342 by selecting the respective one of the candidate cruise control velocities 312 from the range of candidate cruise control velocities 312 that has the greatest drive unit efficiency 344 as the eco-cruise control velocity 342. Moreover, the velocity optimizer 340 may select the respective one of the candidate cruise control velocities 312 from the range of candidate cruise control velocities 312 at a particular traction torque 332 (e.g., 100 newton-meter (Nm)).

In the example shown, the velocity optimizer 340 receives the inverter DC bus voltage 256 and the traction torque vector 332 and determines a corresponding drive unit efficiency 344 for each respective candidate cruise control velocity 312 from the range of candidate cruise control velocities 312. More specifically, the velocity optimizer 340 may determine the corresponding motor efficiencies 344 using the stored drive unit efficiency map 341 based on the traction torque vector 332 and the inverter DC bus voltage 256. Here, the drive unit efficiency map 341 includes a drive unit efficiency 344 for each candidate cruise control velocity 312 at each traction torque 332 from the traction torque vector 332. While drive unit efficiency map 341 only shows two traction torques 332, it is understood that each candidate cruise control velocity 312 may be associated with any number of traction torques 332. Continuing with the example, the velocity optimizer 340 selects the candidate cruise control velocity 312 of 62 MPH at the traction torque 332 of 100 Nm as the eco-cruise control velocity 342 because it has the maximum drive unit efficiency 344 from the range of candidate cruise control velocities 312. Thus, the velocity optimizer 340 outputs the eco-cruise control velocity 342 and the corresponding traction torque 332 to the cruise controller 240 (FIG. 2) configured to operate the vehicle 10 at the eco-cruise control velocity 342. Advantageously, in the example shown, the velocity optimizer 340 generates the eco-cruise control velocity 342 of 62 MPH causing the vehicle 10 to operate at the cruise control velocity of 62 MPH and having a '0.92' drive unit efficiency 344. In contrast, in a conventional cruise control scenario, the cruise controller 240 (FIG. 2) would simply operate the vehicle 10 at the requested cruise control velocity 202 of 60 MPH that has a lower (i.e., less efficient) drive unit efficiency 344 of '0.82' as compared to the '0.92' drive unit efficiency of the eco-cruise control velocity 342.

In some implementations, as the cruise controller 240 (FIG. 2) operates the vehicle 10 at the eco-cruise control velocity 342, one or more operating conditions of the vehicle 10 and/or conditions of the road the vehicle 10 is operating upon change such that the eco-cruise control velocity 342 initially generated by the prediction module 300 is no longer the most efficient cruise control velocity for operating the vehicle 10. For instance, the prediction module 300 may initially determine that operating the vehicle at a cruise control velocity of 62 MPH maximizes the efficiency of the vehicle, but subsequently due to changed conditions operating the vehicle 10 at 62 MPH is no longer the most efficient cruise control velocity to operate the vehicle 10 at anymore. In particular, 62 MPH may no longer be the most efficient cruise control velocity of the vehicle 10 based on a changed road grade, wind speed, and/or road surface condition that the vehicle 10 is now operating upon. Thus, in these instances, it is beneficial for the prediction module 300 to generate the adjusted eco-cruise control velocity 312A to continuously operate the vehicle 10 at a maximum efficiency. Notably, the adjusted eco-cruise control velocity 312A also includes a respective one of the candidate cruise control velocities 312 from the range of candidate cruise control velocities 312.

Figure 4:
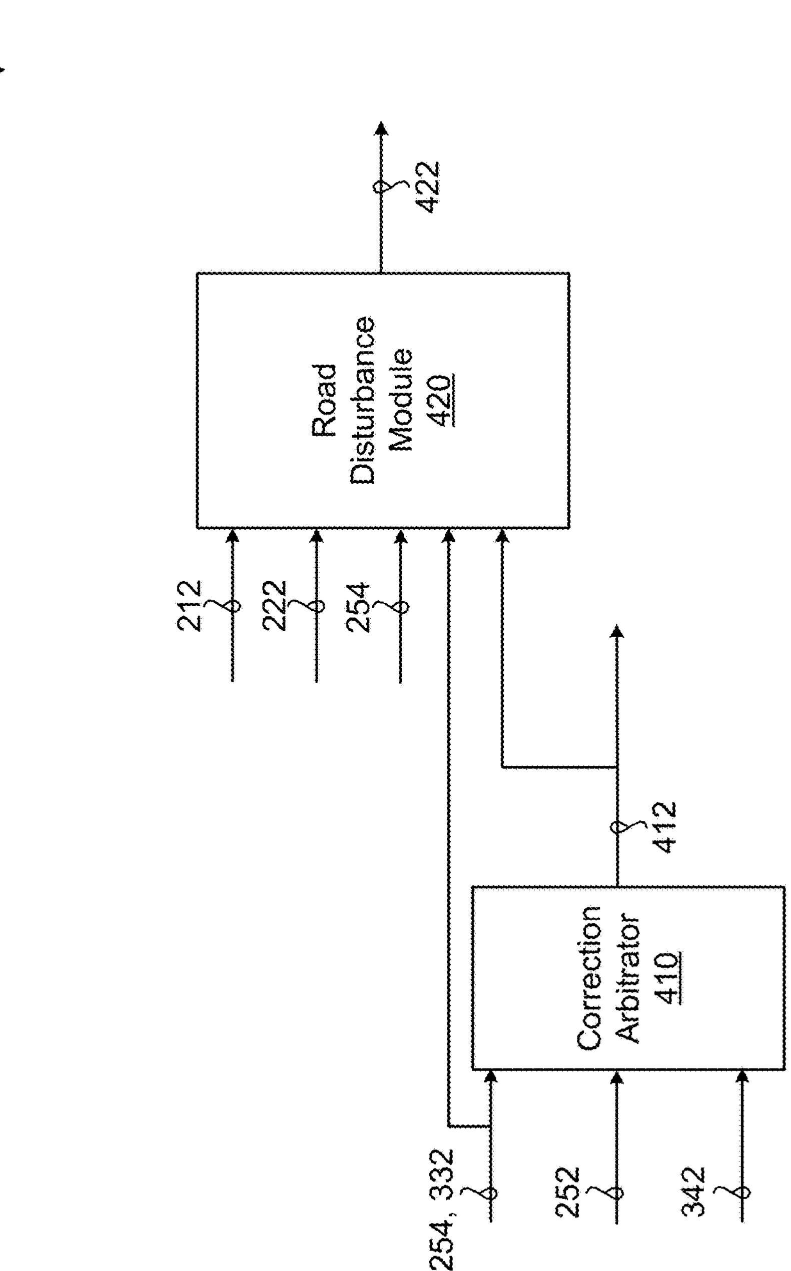
FIG. 4 is a schematic view of an example correction module of the eco-cruise controller.

Referring now to FIG. 4, to that end, the correction module 400 may include a correction arbitrator 410 and a road disturbance module 420. The correction arbitrator is configured to receive, as input, the current velocity 252 of the vehicle, the motor feedback torque 254 from the drive unit 20 (FIG. 2), as well as the eco-cruise control velocity 342 and the traction torque 332 predicted by the prediction module 300 (FIG. 3). Based on the current velocity 252, the motor feedback torque 254, and the corresponding traction torque 332 for the eco-cruise control velocity 342, the correction arbitrator 410 determines whether the vehicle 10 operating at the eco-cruise control velocity 342 satisfies a threshold (e.g., whether the prediction module 300 should adjust the eco-cruise control velocity 342). That is, the correction arbitrator 410 determines whether the adjusted eco-cruise control value 342A needs to be corrected based on the current velocity 252, the motor feedback torque 254, the eco-cruise control velocity 342, the traction torque 332 corresponding to the eco-cruise control velocity 342, or some combination thereof. When the threshold is satisfied, the correction arbitrator 410 outputs the velocity correction trigger 412 to the road disturbance module 420 and the prediction module 300. Otherwise, when the threshold is not satisfied, the correction module 400 refrains from outputting the velocity correction trigger 412 and the vehicle 10 continues to operate at the eco-cruise control velocity 342.

In response to receiving the velocity correction trigger 412, the road disturbance module 420 determines a road disturbance value 422 based on the road grade value 212, the vehicle mass value 222, the traction torque vector 332, the motor feedback torque 254, or some combination thereof. Notably, each of the road grade value 212, the vehicle mass value 222, the traction torque vector 332, the motor feedback torque 254 may include updated values from when the prediction module 300 (FIG. 3) initially generated the eco-cruise control velocity 342 and as the vehicle 10 operates at the eco-cruise control velocity 342. Thus, the road disturbance value 422 may provide additional information to the prediction module 300 (FIG. 3) not initially considered when generating the eco-cruise control velocity 342. The correction module 400 outputs the velocity correction trigger 412 and the road disturbance value 422 to the prediction module 300 thereby causing the prediction module 300 adjust the eco-cruise velocity 342.

Referring back to FIG. 3, in response to receiving the velocity correction trigger 412 and the road disturbance value 422 from the correction module 400 (FIG. 4), the prediction module 300 is configured to adjust the eco-cruise control velocity 342. Notably, the prediction module 300 determines the adjusted eco-cruise control velocity 342A using the additional information of the road disturbance value 422 that was not previously considered when initially determining the eco-cruise control velocity 342. That is, the road disturbance value 422 may indicate changed vehicle operating conditions and/or road conditions the vehicle 10 is operating upon that occurred after the prediction module 300 initially determined the eco-cruise control velocity 342. Changed road conditions may include road grade, wind speed, and road surface condition that are incorporated as part of the road disturbance value 422 and based on sensor data revived from the one or more vehicle sensors 22 (FIG. 1).

In particular, the road load estimator 320 may receive the velocity correction trigger 412 and the road disturbance value 422 thereby causing the road load estimator 320 to determine the required traction force vector 322 for the range of candidate cruise control velocities 312. Here, the road load estimator 320 determines the required traction force vector 322 using the road disturbance value 422 generated by the correction module 400 (FIG. 4) in addition to the road grade value 212, the vehicle mass value 222, the brake drag forces 324, and the bearing drag forces 326. Simply put, the road load estimator 320 leverages the additional information of the road disturbance value 422 in addition to the other information previously used to generate the required traction force vector 322.

Thereafter, the traction torque estimator 330 determines the traction torque vector 332 based on the required traction force vector 322, the final gear ratio 334, and the dynamic radius 335 of the tires. Finally, the velocity optimizer 340 determines a corresponding drive unit efficiency 344 for each candidate cruise control velocity 312 using the drive unit efficiency map 341. Here, the corresponding drive unit efficiency 344 determined for each candidate cruise control velocity 312 may differ from the initially determined corresponding drive unit efficiency 344 based, in part, on the received road disturbance value 422. Thus, the velocity optimizer 340 adjusts the eco-cruise control velocity 342 by selecting another one of the candidate cruise control velocities 312 from the range of candidate cruise control velocities 312 having a greatest drive unit efficiency 344. Here, the adjusted eco-cruise control velocity 342A may include a different candidate cruise control velocity 312 from the range of candidate cruise control velocities 312 than the eco-cruise control velocity 342.

For example, the prediction module 300 generate the eco-cruise control velocity 342 as 62 MPH in the example shown, but in response to receiving the velocity correction trigger 412 and the road disturbances value 422 from the correction module 400 based on changed vehicle conditions and/or road conditions, the prediction module 300 may determine that the candidate cruise control velocity 312 of 59 MPH now includes the greatest drive unit efficiency 344. In short, initially the candidate cruise control velocity 312 of 62 MPH included the greatest drive unit efficiency 344, but as the vehicle 10 operates at 62 MPH and vehicle and/or road conditions change the prediction module 300 receives the road disturbances value 422 resulting in 59 MPH having the greatest drive unit efficiency 344 for the changed vehicle and/or road conditions.

As described above, the eco-cruise controller 230 enables the vehicle 10 to operate at a cruise control velocity that maximizes the efficiency of the vehicle 10. Moreover, because the prediction module 300 selects the eco-cruise control velocity 342 (or adjusted eco-cruise control velocity 342) from the range of candidate cruise control velocities 312 that is determined based on the eco-cruise control request 201 (e.g., received from the driver of the vehicle) is considered a suitable cruise control velocity to operate the vehicle 10 at according to the driver of the vehicle 10. Thus, the eco-cruise controller 230 maximizes efficiency of operating the vehicles 10 without impeding on the driving experience of the driver because the range of candidate cruise control velocities 312 is configurable by the driver as part of the eco-cruise control request 201. Yet another benefit of the eco-cruise controller 230 is that the correction module 400 monitors operating conditions of the vehicle 10 and the road the vehicle 10 is traveling upon at the eco-cruise control velocity 342 to determine whether the prediction module 300 needs to adjust the eco-cruise control velocity 342 to ensure the vehicle continuously operates at maximal efficiency. Thus, when the eco-cruise controller 230 is enabled, the vehicle 10 may operate a multiple different candidate cruise control velocities 312 from the range of candidate cruise control velocities because changed vehicle/road conditions continuously impact the most efficient velocity for operating the vehicle 10.

Figure 5:
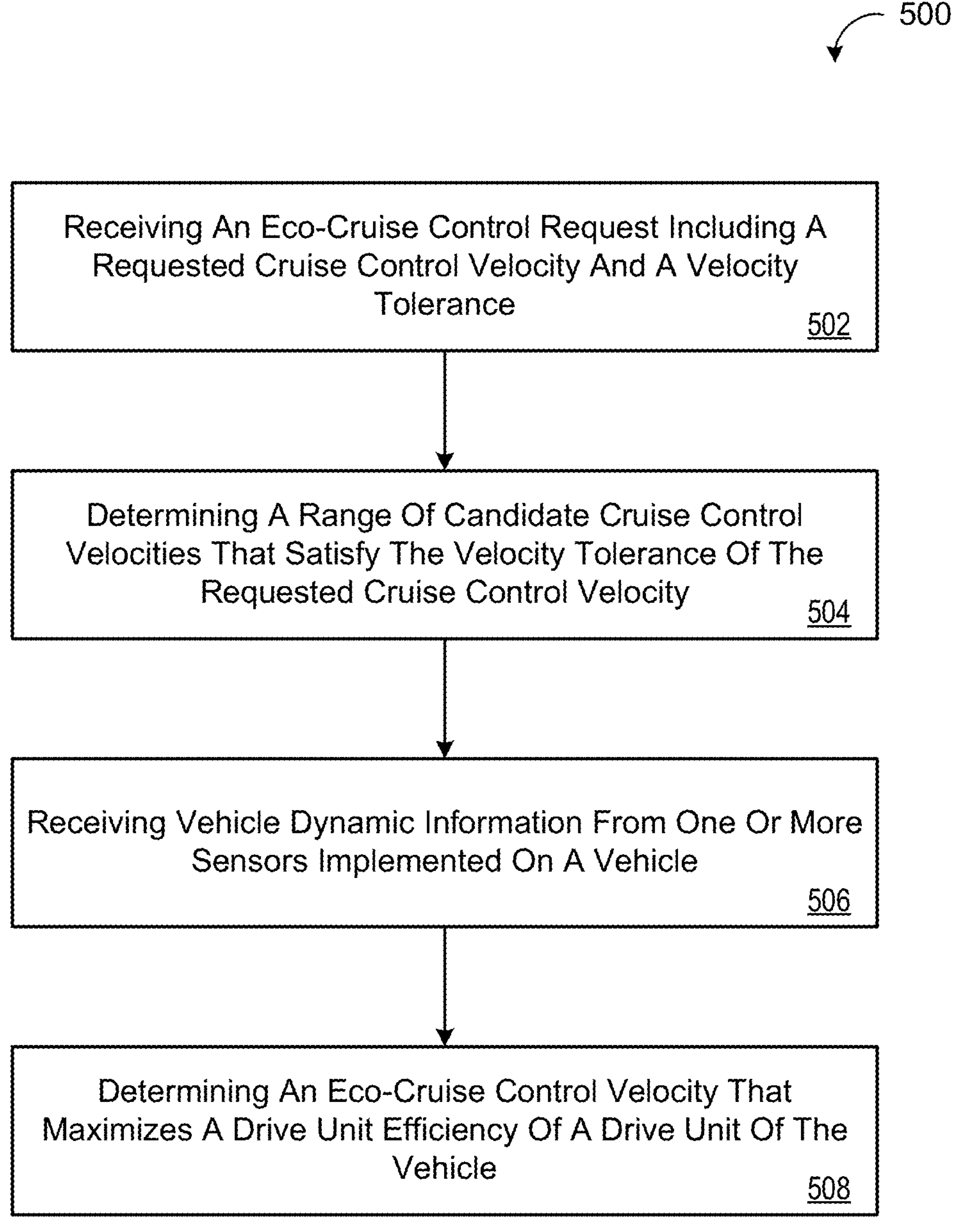
FIG. 5 is a flowchart of an example arrangement of operations for a method of performing an adaptive eco cruise strategy for a vehicle.

FIG. 5 is a flowchart of an exemplary arrangement of operations for a computer-implemented method 500 of performing an adaptive eco cruise strategy for a vehicle. Data processing hardware 610 (FIG. 6) may execute instructions stored on memory hardware 620 (FIG. 6) that cause the data processing hardware 610 to perform operations for the method 500. The data processing hardware 610 and the memory hardware 620 may reside on the control module 16 (FIG. 1) of the vehicle 10. At operation 502, the method 500 includes receiving an eco-cruise control request 201 that includes a requested cruise control velocity 202 and a velocity tolerance 204. The eco-cruise control request 201 instructs the drive unit 20 to operate a vehicle 10 at a velocity with the velocity tolerance of the requested cruise control velocity. At operation 504, the method 500 includes determining a range of candidate cruise control velocities 312 that satisfy the velocity tolerance of the requested cruise control velocity. At operation 506, the method 500 includes receiving vehicle dynamic information from one or more sensors 22 implemented on the vehicle 10. Here, the vehicle dynamic information may include, but is not limited to, a road grade value 212 of a road the vehicle 10 is currently traveling upon, a vehicle mass value 222 of the vehicle 10, an inverter DC bus voltage 256 received from the drive unit 20 implemented on the vehicle 10, the current velocity 252, and/or a road disturbance value 422. At operation 508, the method 500 includes determining an eco-cruise control velocity 342 that maximizes a drive unit efficiency 344 of the drive unit 20. Here, the eco-cruise control velocity 342 includes a one of the candidate cruise control velocities 312 that has a greatest drive unit efficiency 344 from the range of candidate cruise control velocities 312.

Figure 6:
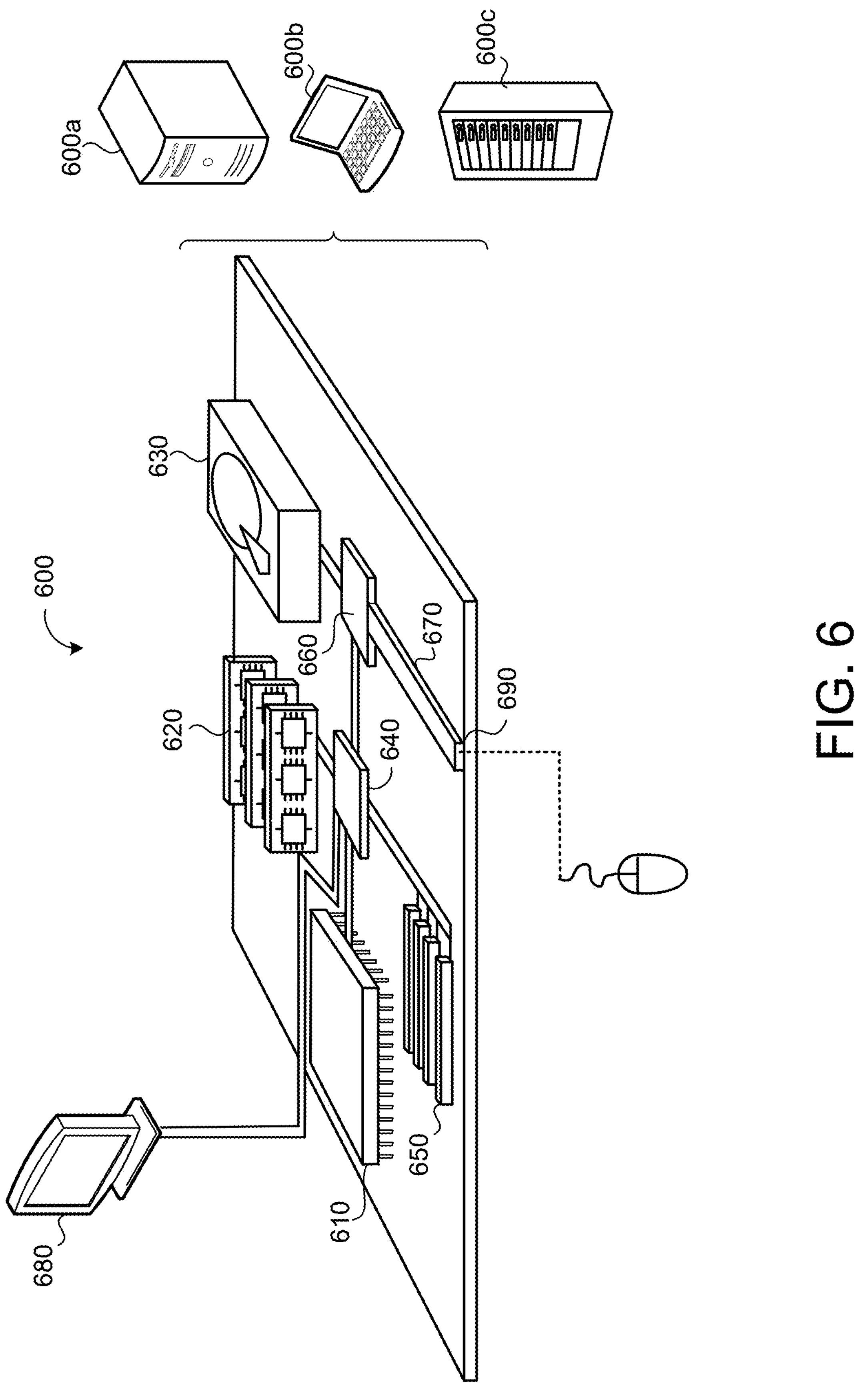
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
- receiving an eco-cruise control request comprising a requested cruise control velocity and a velocity tolerance, the eco-cruise control request instructing an drive unit to operate a vehicle at a velocity within the velocity tolerance of the requested cruise control velocity;
- determining a range of candidate cruise control velocities that satisfy the velocity tolerance of the requested cruise control velocity;
- receiving, from one or more sensors implemented on the vehicle, vehicle dynamic information of the vehicle;
- obtaining a drive unit efficiency map indicating a drive unit efficiency for each combination of traction torque, candidate cruise control velocity, and inverter direct current bus voltage; and
- determining, based on the vehicle dynamic information and the drive unit efficiency map, an eco-cruise control velocity that maximizes a drive unit efficiency of the drive unit, the eco-cruise control velocity comprising one of the candidate cruise control velocities from the range of candidate cruise control velocities.

2. The computer-implemented method of claim 1, wherein determining the range of candidate cruise control velocities comprises setting a median candidate cruise control velocity from the range of candidate cruise control velocities equal to a value of the requested cruise control velocity.

3. The computer-implemented method of claim 1, wherein determining the range of candidate cruise control velocities comprises setting a minimum candidate cruise velocity from the range of candidate cruise control velocities equal to a value of the requested cruise control velocity.

4. The computer-implemented method of claim 1, wherein determining the range of candidate cruise control velocities comprises setting a maximum candidate cruise velocity from the range of candidate cruise control velocities equal to a value of the requested cruise control velocity.

5. The computer-implemented method of claim 1, wherein the operations further comprise, for each respective candidate cruise control velocity from the range of candidate cruise control velocities:

determining a required traction force for the respective candidate cruise control velocity based on a road grade value and a vehicle mass value of the vehicle;

determining a traction torque for a corresponding required traction force based on a final gear ratio of the drive unit and a dynamic radius of tires implemented on the vehicle; and determining a drive unit efficiency for the respective candidate cruise control value based on a corresponding traction torque and an inverter direct current bus voltage value.

6. The computer-implemented method of claim 5, wherein determining the eco-cruise control velocity comprises selecting the one of the candidate cruise control velocities from the range of candidate cruise control velocities having the greatest drive unit efficiency as the eco-cruise control velocity.

7. The computer-implemented method of claim 1, wherein the operations further comprise, while the vehicle operates at the eco-cruise control velocity:

obtaining a current velocity of the vehicle, a motor feedback torque of the drive unit, and a corresponding traction torque for the eco-cruise control velocity;

determining that the vehicle operating at the eco-cruise control velocity satisfies a threshold based on the current velocity of the vehicle, the motor feedback torque obtained from the drive unit, and the corresponding traction torque for the eco-cruise control velocity; and based on determining that the vehicle operating at the eco-cruise control velocity satisfies the threshold, generating a velocity correction trigger.

8. The computer-implemented method of claim 7, wherein the operations further comprise, in response to generating the velocity correction trigger:

determining a road disturbance value based on a road grade value, a vehicle mass value, a corresponding traction torque for the eco-cruise control velocity, and the motor feedback torque; and adjusting, based on the vehicle dynamic information and the road disturbance value, the eco-cruise control velocity.

9. The computer-implemented method of claim 1, wherein the vehicle dynamic information comprises at least one of:

a road grade value of the road the vehicle is traveling upon;

a vehicle mass of the vehicle;

brake drag forces of the vehicle;

wheel bearing drag forces of the vehicle; or an inverter direct current bus voltage of the vehicle.

10. The computer-implemented method of claim 1, wherein the eco-cruise control request is received in response to a user input indication indicating selection of a button disposed on a steering wheel of the vehicle or an instrument panel of the vehicle.

11. The computer-implemented method of claim 1, wherein the operations further comprise:

obtaining a speed limit for a road the vehicle is currently traveling upon, wherein determining the range of candidate cruise control velocities that satisfy the velocity tolerance of the requested cruise control velocity comprises determining the range of candidate cruise control velocities based on the speed limit for the road the vehicle is currently traveling upon.

12. A vehicle comprising:

a drive unit;

data processing hardware; and memory hardware in communication with the data processing hardware and storing instructions that when executed on the data processing hardware cause the data processing hardware to perform operations comprising:

receiving an eco-cruise control request comprising a requested cruise control velocity and a velocity tolerance, the eco-cruise control request instructing the drive unit to operate the vehicle at a velocity within the velocity tolerance of the requested cruise control velocity;

determining a range of candidate cruise control velocities that satisfy the velocity tolerance of the requested cruise control velocity;

receiving, from one or more sensors implemented on the vehicle, vehicle dynamic information of the vehicle;

a drive unit efficiency map indicating a drive unit efficiency for each combination of traction torque, candidate cruise control velocity, and inverter direct current bus voltage; and determining, based on the vehicle dynamic information and the drive unit efficiency map, an eco-cruise control velocity that maximizes a drive unit efficiency of the drive unit, the eco-cruise control velocity comprising one of the candidate cruise control velocities from the range of candidate cruise control velocities.

13. The vehicle of claim 12, wherein determining the range of candidate cruise control velocities comprises setting a median candidate cruise control velocity from the range of candidate cruise control velocities equal to a value of the requested cruise control velocity.

14. The vehicle of claim 12, wherein determining the range of candidate cruise control velocities comprises setting a minimum candidate cruise velocity from the range of candidate cruise control velocities equal to a value of the requested cruise control velocity.

15. The vehicle of claim 12, wherein determining the range of candidate cruise control velocities comprises setting a maximum candidate cruise velocity from the range of candidate cruise control velocities equal to a value of the requested cruise control velocity.

16. The vehicle of claim 12, wherein the operations further comprise, for each respective candidate cruise control velocity from the range of candidate cruise control velocities:

determining a required traction force for the respective candidate cruise control velocity based on a road grade value and a vehicle mass value of the vehicle;

determining a traction torque for a corresponding required traction force based on a final gear ratio of the drive unit and a dynamic radius of tires implemented on the vehicle; and determining a drive unit efficiency for the respective candidate cruise control value based on a corresponding traction torque and an inverter direct current bus voltage value.

17. The vehicle of claim 16, wherein determining the eco-cruise control velocity comprises selecting the one of the candidate cruise control velocities from the range of candidate cruise control velocities having the greatest drive unit efficiency as the eco-cruise control velocity.

18. The vehicle of claim 12, wherein the operations further comprise, while the vehicle operates at the eco-cruise control velocity:

obtaining a current velocity of the vehicle, a motor feedback torque of the drive unit, and a corresponding traction torque for the eco-cruise control velocity;

determining that the vehicle operating at the eco-cruise control velocity satisfies a threshold based on the current velocity of the vehicle, the motor feedback torque obtained from the drive unit, and the corresponding traction torque for the eco-cruise control velocity; and based on determining that the vehicle operating at the eco-cruise control velocity satisfies the threshold, generating a velocity correction trigger.

19. The vehicle of claim 18, wherein the operations further comprise, in response to generating the velocity correction trigger:

determining a road disturbance value based on a road grade value, a vehicle mass value, a corresponding traction torque for the eco-cruise control velocity, and the motor feedback torque; and adjusting, based on the vehicle dynamic information and the road disturbance value, the eco-cruise control velocity.

20. The vehicle of claim 12, wherein the vehicle dynamic information comprises at least one of:

a road grade value of the road the vehicle is traveling upon;

a vehicle mass of the vehicle;

brake drag forces of the vehicle;

wheel bearing drag forces of the vehicle; or an inverter direct current bus voltage of the vehicle.

21. The vehicle of claim 12, wherein the eco-cruise control request is received in response to a user input indication indicating selection of a button disposed on a steering wheel of the vehicle or an instrument panel of the vehicle.

22. The vehicle of claim 12, wherein the operations further comprise:

obtaining a speed limit for a road the vehicle is currently traveling upon, wherein determining the range of candidate cruise control velocities that satisfy the velocity tolerance of the requested cruise control velocity comprises determining the range of candidate cruise control velocities based on the speed limit for the road the vehicle is currently traveling upon.

* * * * *